US008355001B1

(12) United States Patent
Betts-Lacroix et al.

(10) Patent No.: US 8,355,001 B1
(45) Date of Patent: *Jan. 15, 2013

(54) COMPUTER HAVING INTERLOCKING COMPONENTS

(75) Inventors: Joe Betts-Lacroix, San Mateo, CA (US); Nick Merz, San Francisco, CA (US); Josh Een, San Francisco, CA (US); Aaron Julin, Oakland, CA (US); Jenn Cho, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/443,122

(22) Filed: Apr. 10, 2012

Related U.S. Application Data

(63) Continuation of application No. 12/436,437, filed on May 6, 2009, now Pat. No. 8,174,501.

(60) Provisional application No. 61/050,999, filed on May 6, 2008.

(51) Int. Cl.
*G06F 3/02* (2006.01)
*G09G 5/00* (2006.01)

(52) U.S. Cl. .................................. 345/168; 345/169

(58) Field of Classification Search .......... 345/168–172; 341/22; 248/917–924; 340/407.2; 361/679.01, 361/679.03, 679.08, 679.09, 679.26, 679.55, 361/679.56; D14/455, 456, 320, 331, 333, D14/334, 335
See application file for complete search history.

(56) References Cited

U.S. PATENT DOCUMENTS

| | | | | |
|---|---|---|---|---|
| 5,175,671 A | * | 12/1992 | Sasaki | 361/679.43 |
| 5,200,883 A | * | 4/1993 | Kobayashi | 361/679.09 |
| 5,898,600 A | * | 4/1999 | Isashi | 708/105 |
| 6,154,359 A | * | 11/2000 | Kamikakai et al. | 361/679.27 |
| D448,032 S | * | 9/2001 | Talley | D14/396 |
| 7,107,083 B2 | | 9/2006 | Watanabe | |
| 7,142,194 B1 | | 11/2006 | Northway | |
| RE39,429 E | | 12/2006 | Hawkins et al. | |
| 7,158,817 B2 | | 1/2007 | Kubo | |
| 7,221,330 B2 | | 5/2007 | Finke-Anlauff | |
| 7,620,425 B2 | | 11/2009 | Ju | |
| 7,715,890 B2 | | 5/2010 | Kim et al. | |
| 2001/0001859 A1 | * | 5/2001 | Hawkins et al. | 708/100 |
| 2004/0125549 A1 | * | 7/2004 | Iredale | 361/681 |
| 2005/0002158 A1 | * | 1/2005 | Olodort et al. | 361/683 |
| 2005/0105264 A1 | * | 5/2005 | Chen | 361/683 |
| 2005/0168446 A1 | * | 8/2005 | Majdoub | 345/168 |
| 2005/0225217 A1 | * | 10/2005 | Nay et al. | 312/208.1 |
| 2006/0075934 A1 | * | 4/2006 | Ram | 108/44 |
| 2006/0077621 A1 | * | 4/2006 | Adatia | 361/681 |

\* cited by examiner

*Primary Examiner* — Ricardo L Osorio
(74) *Attorney, Agent, or Firm* — Morris & Kamlay LLP

(57) ABSTRACT

A computer has a display, keyboard and two main component parts. The components each have an L-shape and are linked together to enable sliding movement in substantially one plane in a first direction. The linkage also enables movement orthogonally with respect to the first direction in another plane, such that the components transition from a closed position of the computer in which the components interfit together to form a first right rectangular prism and in which the display is exposed, to an open position having a second right rectangular prism shape in which the keyboard is exposed adjacent to and in the same plane as the display.

10 Claims, 7 Drawing Sheets

US 8,355,001 B1

COMPUTER HAVING INTERLOCKING COMPONENTS

The present application is a continuation of U.S. non-provisional Application No. 12/436,437 filed May 6, 2009, now U.S. Pat. No. 8,174,501 which claims priority to U.S. provisional application No. 61/050,999 filed May 6, 2008, the entirety of each of which is hereby incorporated by reference.

FIELD OF THE INVENTION

The invention relates to a computer having two main parts that are of an L-shape which interfit with one another in open and closed positions.

BACKGROUND OF THE INVENTION

Computing devices of compact design have main components such as the keyboard and display that are connected to each other and that are able to be arranged in closed and open positions. For example, in a laptop computer, the keyboard is in a bottom half of the computer and is hinged to the top half of the computer which has the display. This enables closure of a laptop in which the display covers the keyboard. In smaller computers, such as hand-held computers or ultra mobile personal computers (UMPCs), the display is visible even in the closed position, however the keyboard is covered in the closed position.

SUMMARY OF THE INVENTION

The present invention provides a computer having two main component parts, each having an L-shape. The components are linked together to enable sliding movement in one direction or substantially in one plane, and also to enable movement orthogonally with respect to the first direction, in another plane or dimension. This enables transition from a closed position of the computer in which the components interfit together to form a first cuboid or right rectangular prism and in which the display is exposed, to an open position having a second cuboid or right rectangular shape in which the keyboard is exposed adjacent to and in the same plane as the display.

DETAILED DESCRIPTION OF THE PREFERRED EMBODIMENTS

Figure 1:
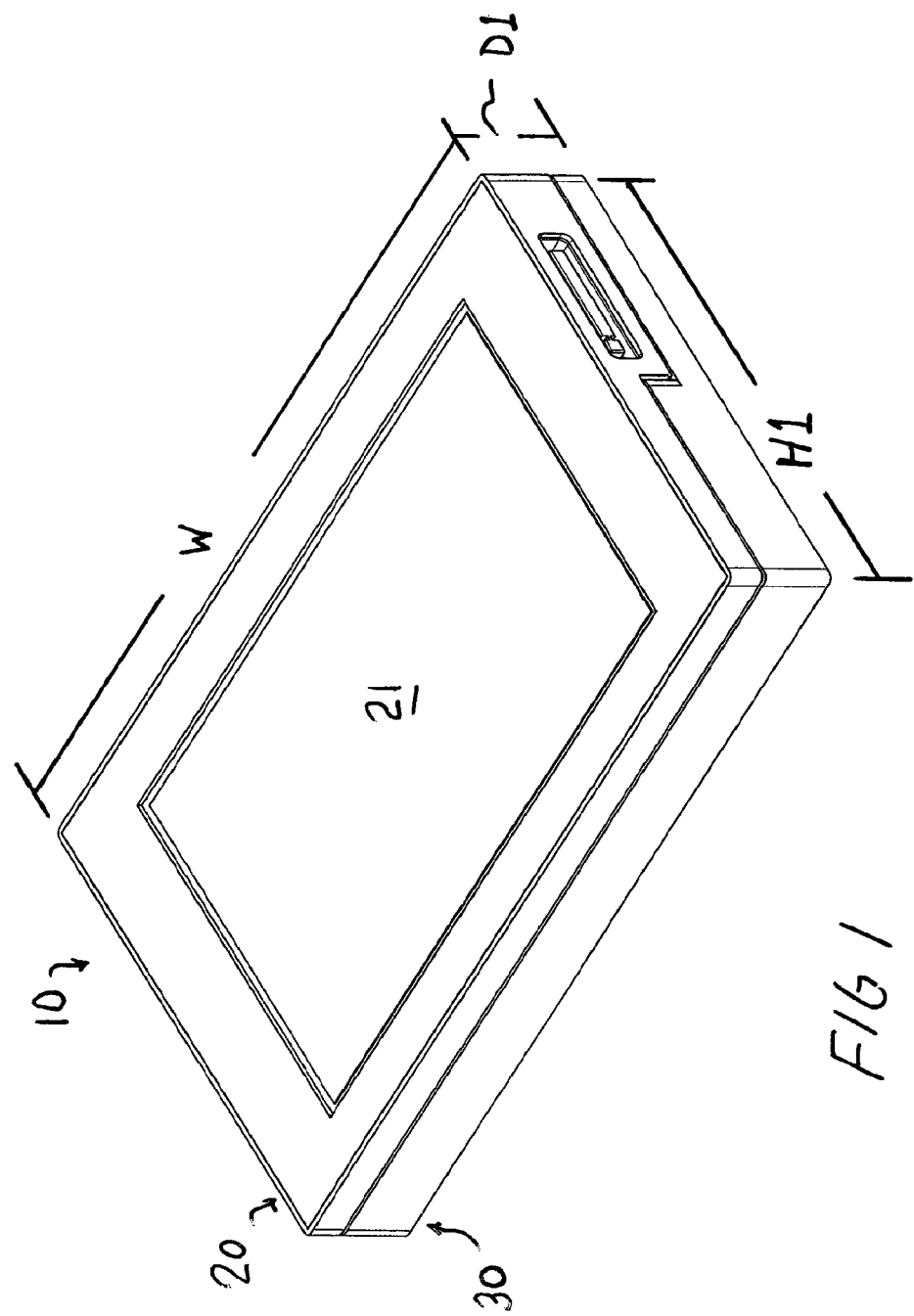
FIG. 1 is a perspective view of the computer of the present invention in a closed position.
Figure 2:
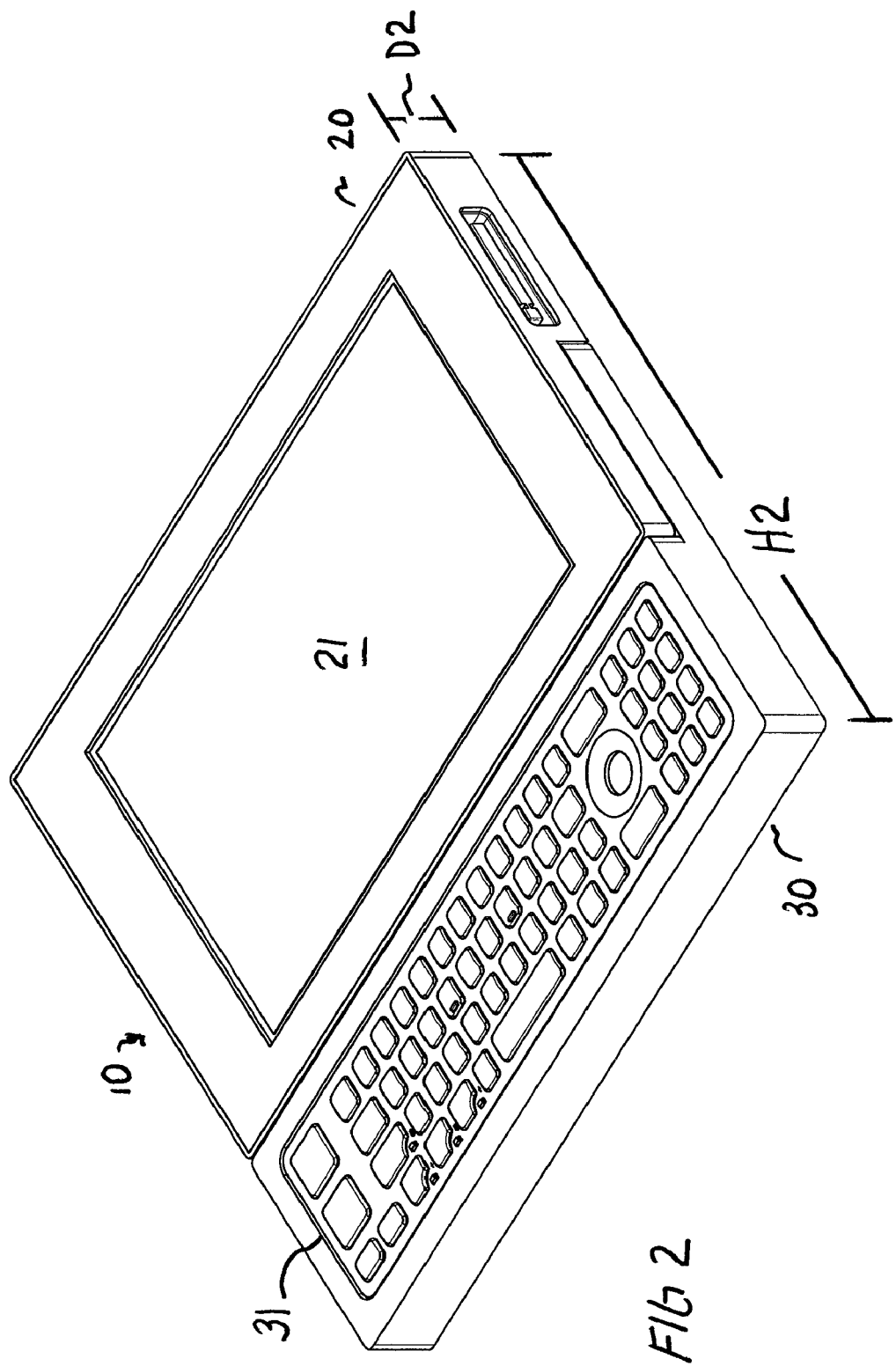
FIG. 2 is a perspective view of the computer of FIG. 1 in an open position.

FIG. 1 shows a perspective view of the computer 10 having main component parts 20 and 30 of L-shape. As shown in FIGS. 1 and 2, the upper main component part 20 has a display 21 and the lower main component part 30 has a keyboard, generally indicated at 31.

Figure 3:
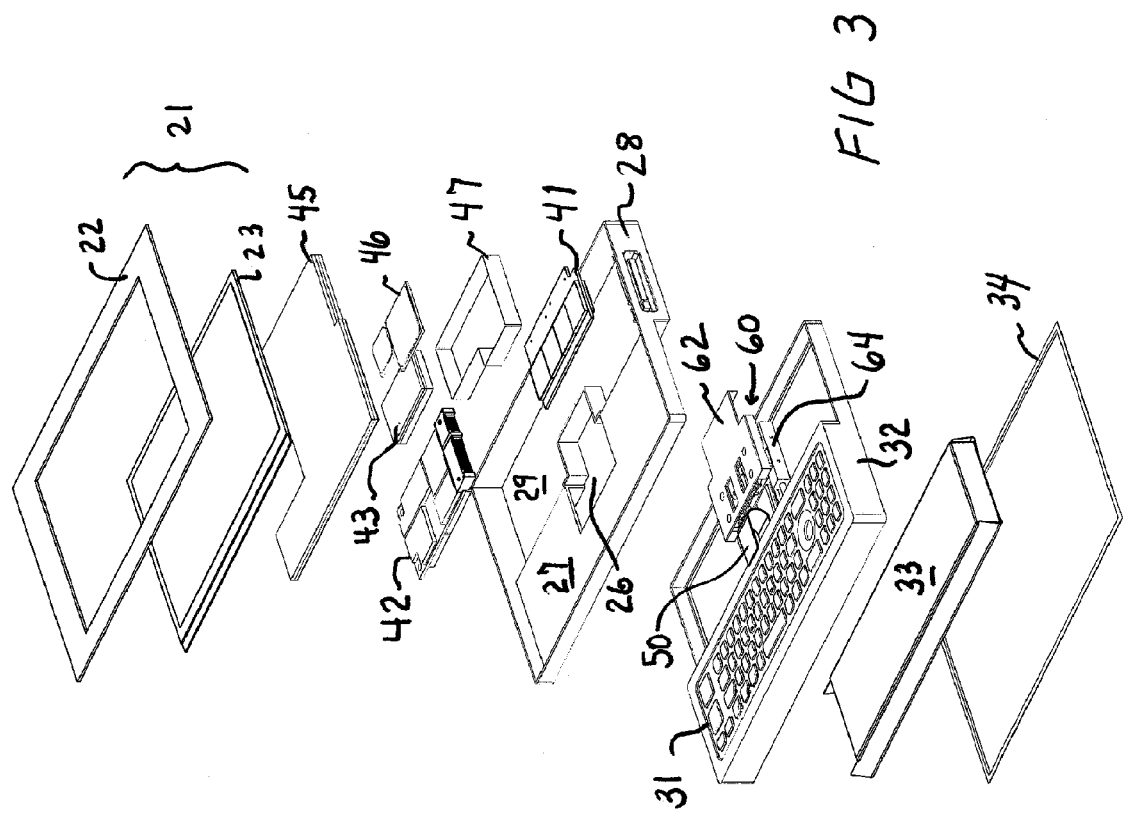
FIG. 3 is a diagram in exploded view of the computer of FIG. 1.

FIG. 3 is a diagram in exploded view of the computer 10 shown in FIG. 1. The display 21 of the upper part of the computer has a display bezel 22 and a glass or plastic faced display panel 23, which is, for example, back lit and optionally includes a touch screen. The display panel, back light, optional touch screen and bezel are part of a display assembly or display 21. A main logic board 45 is positioned below or underneath the display 21.

Underneath the display 21 are various functional devices of the computer that are adapted to fit within the display housing 28. Display housing 28 is generally L-shaped in side view as shown in FIG. 3. Within a cavity 29 of housing 28 are fit several components of the computer, such as a PCB 41 having RAM chips or other memory, a communications board 42, a communications board 43 and a chip set 46. The chip set 46 has a CPU and a GPU, for example. Additionally, EMI shielding 47 is provided to encase chip set 46.

Board 42 provides for Ethernet, Wireless WAN, EV-DO with mobile broadband, etc. communications for the computer. Board 43 enables WiFi and Bluetooth communications, for example.

Each of the components 41, 42, 43, 46 and 47 are of a shape that fit within cavity 29 of the lower housing 28. Over top of these components, and also fitted within the housing 28, is the MLB 45 and the display assembly 21. Accordingly, these components fit together within housing 28 to constitute the upper main component 20 of computer 10.

The lower component of the computer is linked to the upper component through a linkage 60 received in a pocket or recess 26 that extends from a portion 27 of the housing 28 part way into the cavity or area 29, and which accommodates an upper guide mechanism 62 of linkage 60. The linkage enables the movement between the upper and lower components that occurs when opening and closing the computer.

It is understood that the component parts in the upper housing 28 are connected together for operation through connections among the component parts or through flexible circuits, omitted, not shown in detail. One flexible circuit 50 is shown that provides the connection for power from battery 33 and input from keyboard 31 and associated input (mouse and ports) to the components that are in the upper housing 28. The flexible circuit is partly folded back on itself in a closed position and extends when the components 20 and 30 are moved relative to one another in the open position.

Figure 4:
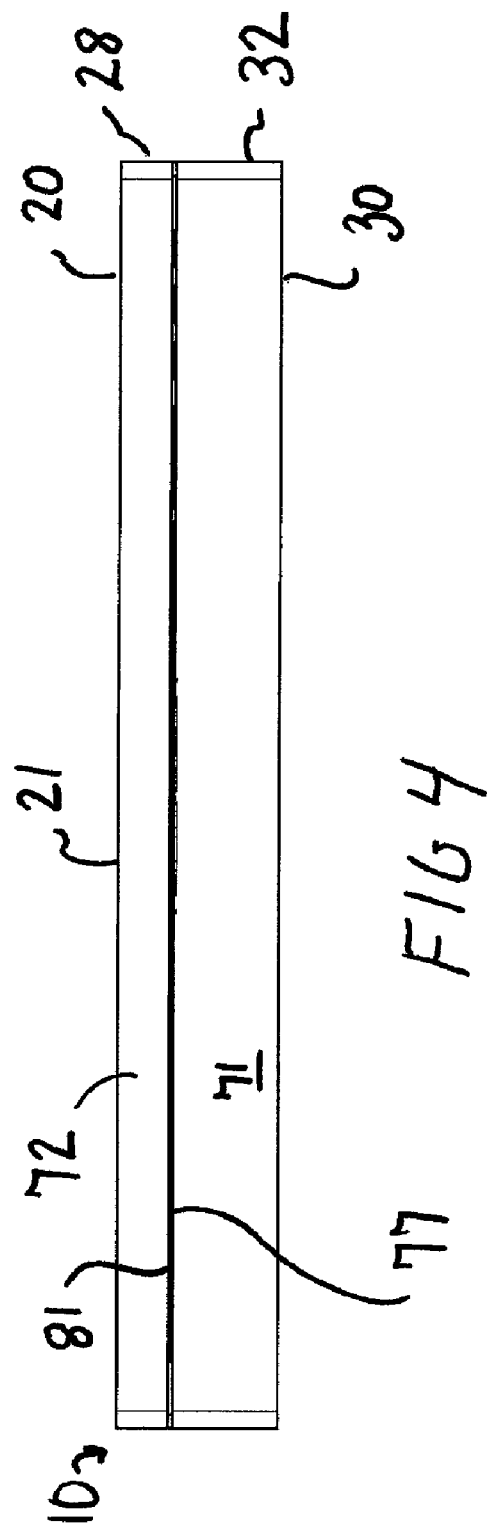
FIG. 4 is a front view of the computer of FIG. 1 in a closed position.
Figure 5:
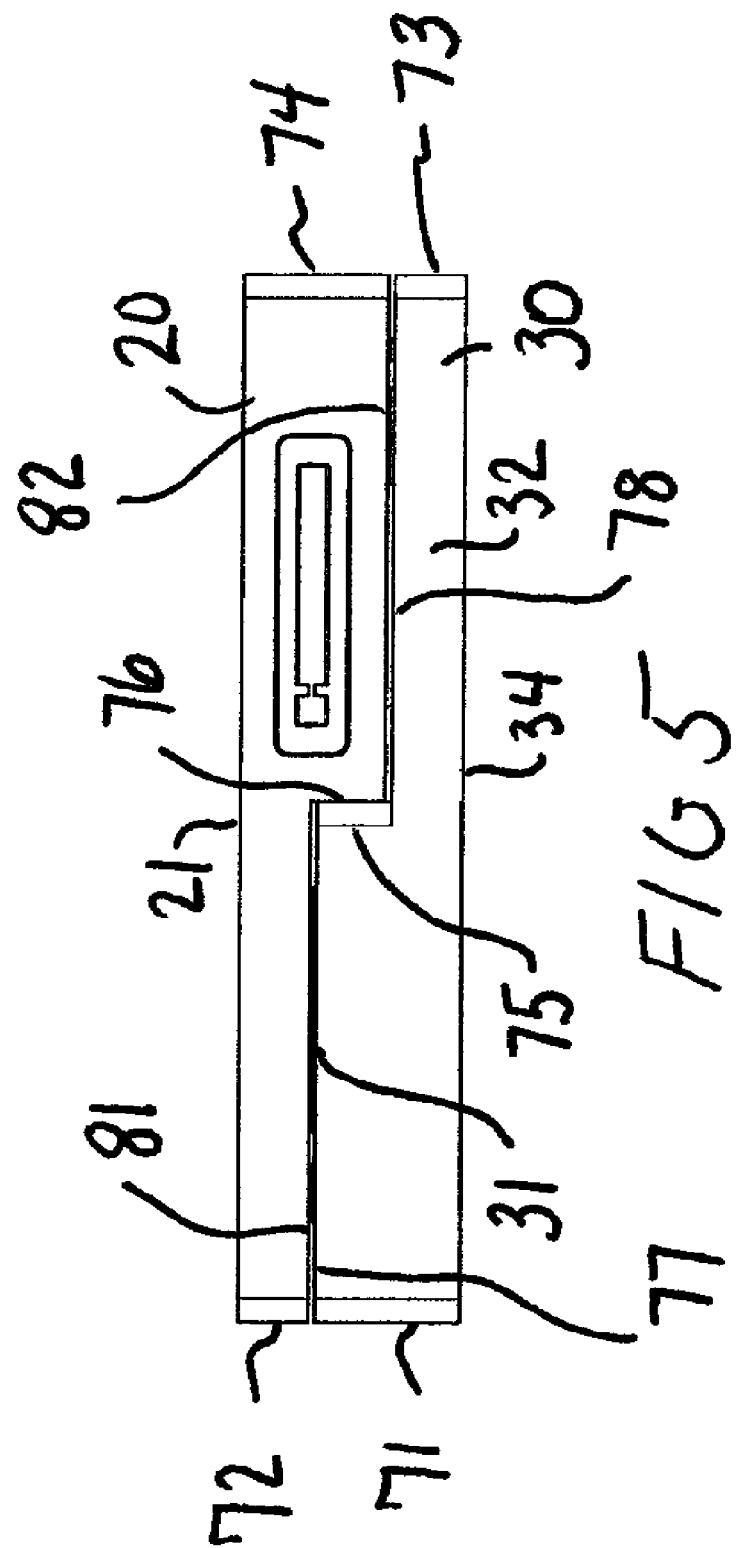
FIG. 5 is a side view of the computer of FIG. 1 in a closed position.

FIG. 4 shows a front view of the computer 10 in the closed position and FIG. 5 shows a side view of the computer 10 in a closed position. As shown in FIG. 5, a port is provided, for example, in the upper component 20 of the computer. Additional ports are also provided for the computer in either or both of the components 20, 30 to enable communications and connections to peripheral devices.

The L-shape of each component 20, 30 enables the computer to be positioned in a closed position that has a shape of a cuboid with rectangular base and sides, also known as a right rectangular prism. The cuboid has dimensions of width W, height H1 and depth D1 as shown in FIG. 1 when in the closed position. FIG. 2 shows the open position of computer 10 which forms a shape of a right rectangular prism of different dimensions, e.g. W, H2 and D2. H2 is greater than H1, whereas D2 is less than D1 and the width dimension W does not change between the open and closed positions.

Figure 6:
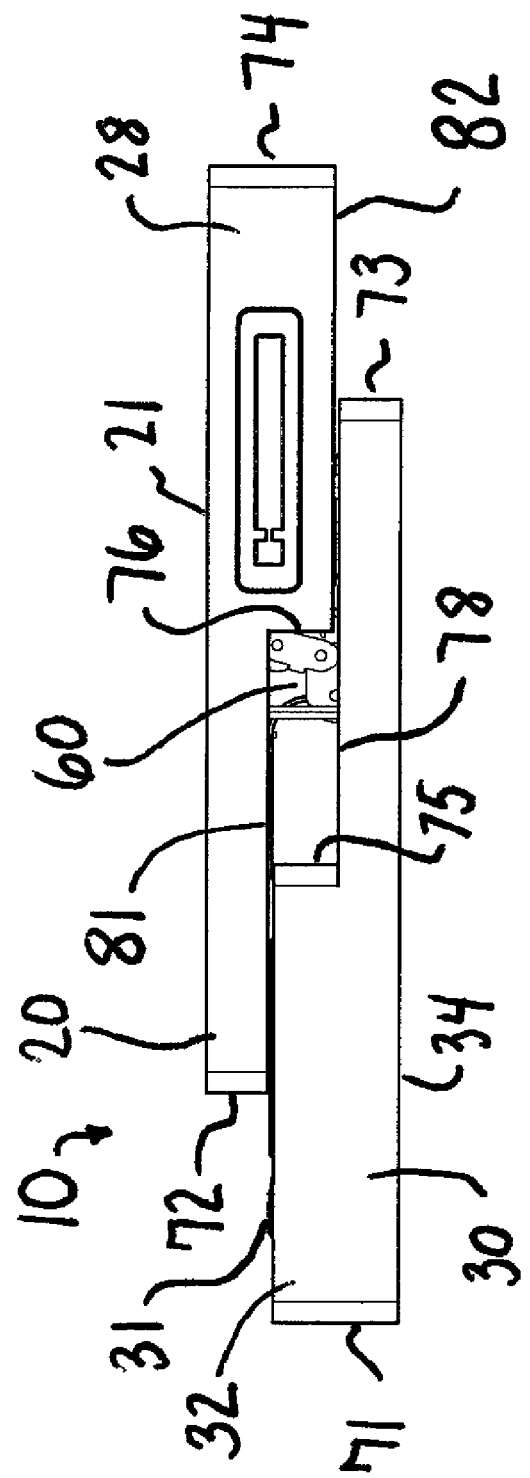
FIG. 6 is a side view of the computer of FIG. 1 in transition between the open and closed positions.
Figure 7:
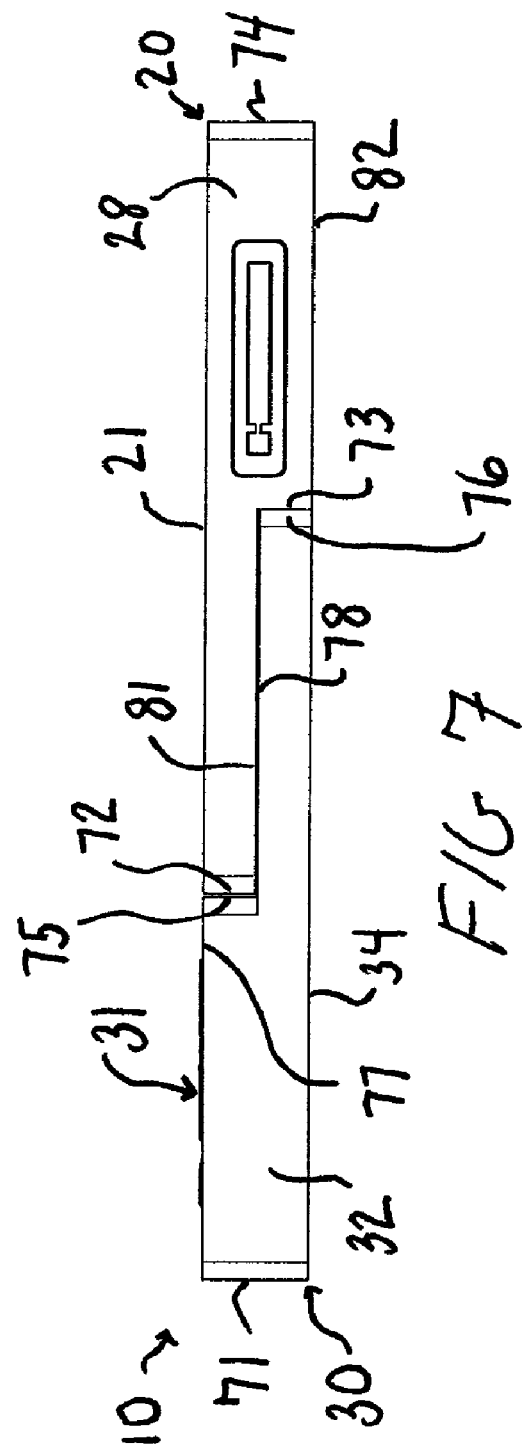
FIG. 7 is a side view of the computer of FIG. 1 in the open position.

FIG. 6 shows the position of transition between the closed and open positions of the computer 10; and FIG. 7 shows a side view of the computer in the open position, also shown in FIG. 2. The upper component 20 of the computer 10 moves relative to the lower component of the computer 30 in the initial opening movement of the two components. The linkage 60 enables the movement in one plane at first, then enables a second movement of the components, once the furthest extent of the first movement is achieved, in a direction essentially orthogonal to the first direction of movement to achieve the position shown in FIGS. 2 and 7.

As shown in FIG. 6, the upper component 20 is linked to the lower component 30 by a linkage generally indicated by reference number 60 in FIG. 3. The linkage includes an upper guide mechanism 62 having a fastening plate that is fixed to the display housing 28. The upper fastening plate 62 has a carriage structure fixed to the housing 28 that slides along a base part or lower guide mechanism 64 fixed to the bottom housing 32. At first, the linkage permits the upper fastening plate or upper guide mechanism 62 to slide in a direction away from keyboard 31 substantially along a single plane. Then, after moving a certain distance in the first direction, the linkage between the upper guide mechanism and lower guide mechanism 64 enables the upper guide mechanism (and upper housing 28) to drop down (orthogonally) into the position shown in FIGS. 2 and 7. That is, the upper guide mechanism 62 fits within a recess 26 of the upper housing 28 so that movement of the upper housing 28 occurs as a result of movement of upper guide mechanism 62 in the direction away from the keyboard 31.

Referring again to FIGS. 4-7, the front of the computer has a lower front face 71, of component 20, and an upper front face 72, of component 30. Opposite to these are a lower end face 73 and upper end face 74, respectively. As a result of each of lower and upper components 30 and 20 being L-shaped, there is a lower intermediate face 75 of component 30 and an upper intermediate face 76 of the upper component 20. Further, the lower housing 32 has a first top wall 77 and a second top wall 78. The first top wall 77 is substantially composed of keyboard 31 and a perimeter frame around the keyboard. The upper component 20 (upper housing 28) has a top wall that is substantially the display 21. The upper housing 28 also has a first bottom wall 81 and a second bottom wall 82 between which is the upper intermediate wall 76.

In opening the computer, the first bottom wall 81 and the second bottom wall 82 of the upper component 20 of the computer move in proximity to the first top wall 77 and second top wall 78 of the lower component 30, respectively. The movement occurs essentially along a single plane or in a first dimension. After the sufficient extent of movement of the upper guide mechanism 62 with respect to the lower guide mechanism 64 has been achieved, the linkage permits downward movement of the upper component or housing 28 with respect to the lower component 30. That is, at the full open position, the front face 72 of the upper component of the computer moves down adjacent the lower intermediate face 75 of the lower component or housing 32, while the upper intermediate face 76 moves down adjacent the lower end face 73 of the lower computer until the upper and lower components 20, 30 interfit or interlock together in the open position shown in FIGS. 2 and 7.

In the open position shown in FIGS. 2 and 7, the computer takes on a right rectangular prism shape that is convenient for use as a hand held device and also when the device is supported on a planar surface. Further, the computer in the closed position is in a right rectangular prism shape and therefore is compact when in the closed position. As a result, the device is convenient for transportation or limited use in the closed position and also convenient for use in the open position.

While preferred embodiments have been set forth with specific details, further embodiments, modifications and variations are contemplated according to the broader aspects of the present invention.

The invention claimed is:

1. A device comprising:
   a top component;
   a bottom component; and
   a linkage connecting the bottom component to the top component, the linkage enabling sliding movement of the top portion relative to the bottom portion in substantially a first plane in a first direction, and in substantially a second plane orthogonal to the first plane in a second direction,
   wherein the components transition from a closed position in which the top component and the bottom component interfit to form a first right rectangular prism, to an open position having a second right rectangular prism shape in which the bottom component is disposed adjacent to and in substantially the same plane as the top component.

2. A device as recited in claim 1, wherein the top component comprises a touch screen.

3. A device as recited in claim 1, wherein the linkage allows movement in the second direction only after movement of a certain distance in the first direction.

4. A device as recited in claim 3, wherein the linkage allows movement in the second direction only when the furthest extent of movement in the first direction is achieved.

5. A device as recited in claim 1, wherein the top component and the bottom component interlink in the open position.

6. A device as recited in claim 1, wherein the linkage is at least partially disposed in a cavity within the top component.

7. A device as recited in claim 1, wherein the linkage is at least partially disposed in a cavity within the bottom component.

8. A device as recited in claim 1, wherein the bottom component comprises a keyboard.

9. A device as recited in claim 1, wherein the top component comprises an approximately L-shaped housing.

10. A device as recited in claim 1, wherein the bottom component comprises an approximately L-shaped housing.

* * * * *